(12) United States Patent
Ishizuka

(10) Patent No.: US 10,516,634 B2
(45) Date of Patent: Dec. 24, 2019

(54) INFORMATION PROCESSING DEVICE, DISPLAY METHOD AND COMPUTER PROGRAM FOR ASSOCIATING COMMENTS WITH VIDEO CONTENT

(71) Applicant: Sony Interactive Entertainment Inc., Tokyo (JP)

(72) Inventor: Kensaku Ishizuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 318 days.

(21) Appl. No.: 15/035,064

(22) PCT Filed: Jun. 10, 2014

(86) PCT No.: PCT/JP2014/003088
§ 371 (c)(1),
(2) Date: May 6, 2016

(87) PCT Pub. No.: WO2015/075850
PCT Pub. Date: May 28, 2015

(65) Prior Publication Data
US 2016/0277328 A1 Sep. 22, 2016

(30) Foreign Application Priority Data
Nov. 19, 2013 (JP) .................. 2013-239285

(51) Int. Cl.
*H04N 21/8545* (2011.01)
*H04L 12/58* (2006.01)
(Continued)

(52) U.S. Cl.
CPC .......... *H04L 51/046* (2013.01); *G06F 3/0482* (2013.01); *G06F 3/0485* (2013.01); *H04L 51/26* (2013.01)

(58) Field of Classification Search
CPC ....... H04L 51/046; H04L 51/26; G06F 13/00; G06F 3/0482; G06F 3/0485; G11B 27/00;
(Continued)

(56) References Cited

U.S. PATENT DOCUMENTS 5,297,032 A * 3/1994 Trojan .................. G06Q 40/04
340/4.5
2007/0234194 A1 10/2007 Tsuchiya
(Continued)

FOREIGN PATENT DOCUMENTS

JP 2003158726 A 5/2003
JP 2007274090 A 10/2007
(Continued)

OTHER PUBLICATIONS

Extended European Search Report for corresponding EP Application No. 14863532.9, 7 pages, dated May 30, 2017.
(Continued)

*Primary Examiner* — Jennifer N To
*Assistant Examiner* — Amy P Hoang
(74) *Attorney, Agent, or Firm* — Matthew B. Dernier, Esq.

(57) ABSTRACT

A video displaying section displays video content in a video display region on a viewing screen. A comment acquiring section acquires a comment with regard to the currently displayed video content. A comment displaying section causes the viewing screen currently displaying the video content to scroll a comment acquired by the comment acquiring section. The comment displaying section displays a comment when the position of the comment does not overlap with the video display region and hides from view a comment when the position of the comment overlaps with the video display region.

14 Claims, 12 Drawing Sheets

(51) Int. Cl.
*G06F 3/0482* (2013.01)
*G06F 3/0485* (2013.01)

(58) Field of Classification Search
CPC ......... H04N 21/47205; H04N 21/4788; H04N 21/4316; H04N 21/8545; H04N 21/8547
See application file for complete search history.

(56) References Cited

U.S. PATENT DOCUMENTS

| | | | | |
|---|---|---|---|---|
| 2007/0245243 | A1* | 10/2007 | Lanza | G06F 17/30817 715/723 |
| 2008/0168512 | A1* | 7/2008 | Nguyen | H04N 7/165 725/105 |
| 2013/0097476 | A1* | 4/2013 | Kuroda | G06F 17/211 715/201 |
| 2013/0103773 | A1* | 4/2013 | Tsukidate | H04L 51/12 709/206 |
| 2013/0216203 | A1* | 8/2013 | Nakazawa | H04N 9/79 386/241 |
| 2013/0242193 | A1 | 9/2013 | Takao | |
| 2014/0013200 | A1* | 1/2014 | White | H04N 21/235 715/230 |
| 2014/0089099 | A1* | 3/2014 | Money | G06F 3/0485 705/14.66 |
| 2014/0344853 | A1* | 11/2014 | Maruyama | H04N 21/8133 725/32 |
| 2017/0223422 | A1* | 8/2017 | Maruyama | G06K 9/00671 |

FOREIGN PATENT DOCUMENTS

| | | |
|---|---|---|
| JP | 2009212630 A | 9/2009 |
| JP | 2012114525 A | 6/2012 |
| JP | 2012186834 A | 9/2012 |
| JP | 2012221129 A | 11/2012 |
| JP | 2013013095 A | 1/2013 |
| JP | 2013089052 A | 5/2013 |
| WO | 2013001690 A1 | 1/2013 |

OTHER PUBLICATIONS

International Preliminary Report on Patentability and Written Opinion for corresponding PCT Application No. PCT/JP2014/003088, 23 pages, dated Jun. 2, 2016.

International Search Report for corresponding PCT Application No. PCT/JP2014/003088, 4 pages, dated Sep. 16, 2014.

[User Nama] Enquete, Kome Ura Nagashi Kino Kokai, Niconico Info, [online], Internet <URL:http://blog.nicovideo.jp/niconews/2009/09/004275.html>, 1 page, Sep. 3, 2009 (for relevancy see International Search Report for corresponding PCT Application No. PCT/JP2014/003088, 4 pages, dated Sep. 16, 2014 cited above).

Niconico Doga, ni Miru Contents no Ryutsu Sokushin ni Hitsuyo na Koto towa, Monthly B-maga, vol. 9, No. 1, 7 pages, Jan. 10, 2010 (for relevancy see International Search Report for corresponding PCT Application No. PCT/JP2014/003088, 4 pages, dated Sep. 16, 2014 cited above).

GV-TV100 Help Gamen de Miru Manual, [online], I 0 Data Kiki, Internet <URL:http://www.iodata.jp/lib/manual/gv-tv100/index.htm>, 18 pages, Nov. 5, 2013 (for relevancy see International Search Report for corresponding PCT Application No. PCT/JP2014/003088, 4 pages, dated Sep. 16, 2014 cited above).

TV Gamen ni Chokusetsu Comment ga Toko Dekiru! Niconico Jikkyo Mode Tosai Chideji Taio TV Tuner 'Terekingu' Hatsubai, excite News, [online], Internet <URL:http://www.excite.co.jp/News/it biz/20111123/Dreaminnovation vent news akBS1evaX8.html>, 1 page, Nov. 23, 2011 (for relevancy see International Search Report for corresponding PCT Application No. PCT/JP2014/003088, 4 pages, dated Sep. 16, 2014 cited above).

Notification of Reason for Refusal for corresponding JP Application No. 2013-239285, 12 pages, dated Aug. 23, 2016.

The First Office Action for corresponding CN Application No. 201480062049.8, 20 pages, dated Apr. 4, 2018.

"What is needed in promoting the distribution of content in the case of Niconico Video" Gekkan B-Maga, vol. 9, 1st Issue, Japan, Satemaga Bi Inc, 7 pages, for relevance see, Notification of Reason for Refusal for corresponding JP Application No. 2013-239285, 12 pages, dated Aug. 23, 2016 (cited above).

* cited by examiner

PROGRAM VIEWING SYSTEM 10

FIG.9

| POSTING TIME | COMMENT TEXT |
|---|---|
| 00:12:01 | WWWW |
| 00:12:02 | YEES |
| 00:12:03 | GOOOOAL |
| 00:12:04 | FINISHED |

FIG. 12

| CHANNEL SETTINGS | | |
|---|---|---|
| CHANNELS | BROADCASTING STATIONS | COMMENT DESTINATION STATIONS |
| 01 | AAA GENERAL | AAA GENERAL |
| 02 | AAA EDUCATIONAL | AAA EDUCATIONAL |
| 04 | BBB TV | BBB TV |
| 06 | CCC | CCC |
| 08 | TV DDD | TV YYY |

136
138
140

INFORMATION PROCESSING DEVICE, DISPLAY METHOD AND COMPUTER PROGRAM FOR ASSOCIATING COMMENTS WITH VIDEO CONTENT

TECHNICAL FIELD

The present invention relates to data processing technology. More particularly, the invention relates to techniques for displaying video content.

BACKGROUND ART

In recent years, there have been offered services allowing users viewing a currently broadcast program to post their comments about the program to a website so that other users can view the posted comments.

SUMMARY

Technical Problem

To the inventors, the above type of service seems to be useful as means for providing users with a novel experience in posting and viewing comments but does not appear to be sufficiently easy to use in reality under various rules and restrictions.

The present invention has been made in view of the above circumstances. A primary object of the present invention is to provide techniques for providing users with a novel experience in viewing video content in a highly convenient manner.

Solution to Problem

In solving the above problem and according to one mode of the present invention, there is provided an information processing device including: a video displaying section configured to display video content in a video display region on a screen; a comment acquiring section configured to acquire a comment related to the video content; and a comment displaying section configured to scroll a comment acquired by the comment acquiring section on the screen currently displaying the video content. The comment displaying section displays a comment when a position of the comment does not overlap with the video display region and hides from view a comment when a position of the comment overlaps with the video display region.

According to another mode of the present invention, there is provided an information processing device including: a video displaying section configured to display a video of a recorded program; a comment acquiring section configured to acquire a comment posted during broadcast of the program; and a comment displaying section configured to display a comment acquired by the comment acquiring section on a screen currently displaying the video of the program. Data of the program is associated with time information related to the broadcast, and a comment acquired by the comment acquiring section is associated with time information related to the posting. When a video corresponding to a given time point is displayed, the comment displaying section displays a comment associated with time information indicative of the time point.

According to a further mode of the present invention, there is provided an information processing device including: a video displaying section configured to display a video of a program broadcast by a first broadcaster; a comment acquiring section configured to acquire a comment of a viewer with regard to a program broadcast by a second broadcaster; and a comment displaying section configured to display, on a screen currently displaying the video of the program broadcast by the first broadcaster, the comment of the viewer acquired by the comment acquiring section with regard to the program broadcast by the second broadcaster. The second broadcaster is different from the first broadcaster and belongs to a broadcasting network same as a broadcasting network of the first broadcaster.

Where other combinations of the above-outlined components or the above expressions of the present invention are converted between different forms such as a method, a system, a program, and a recording medium storing such a program, they still constitute effective modes of the present invention.

Advantageous Effect of Invention

According to the present invention, users are offered a novel experience in viewing video content in a highly convenient manner.

BRIEF DESCRIPTION OF DRAWINGS

FIG. 9 is a schematic diagram showing a data structure of comments.

FIG. 12 is a schematic diagram showing a channel setting screen.

DESCRIPTION OF EMBODIMENT

Figure 1:
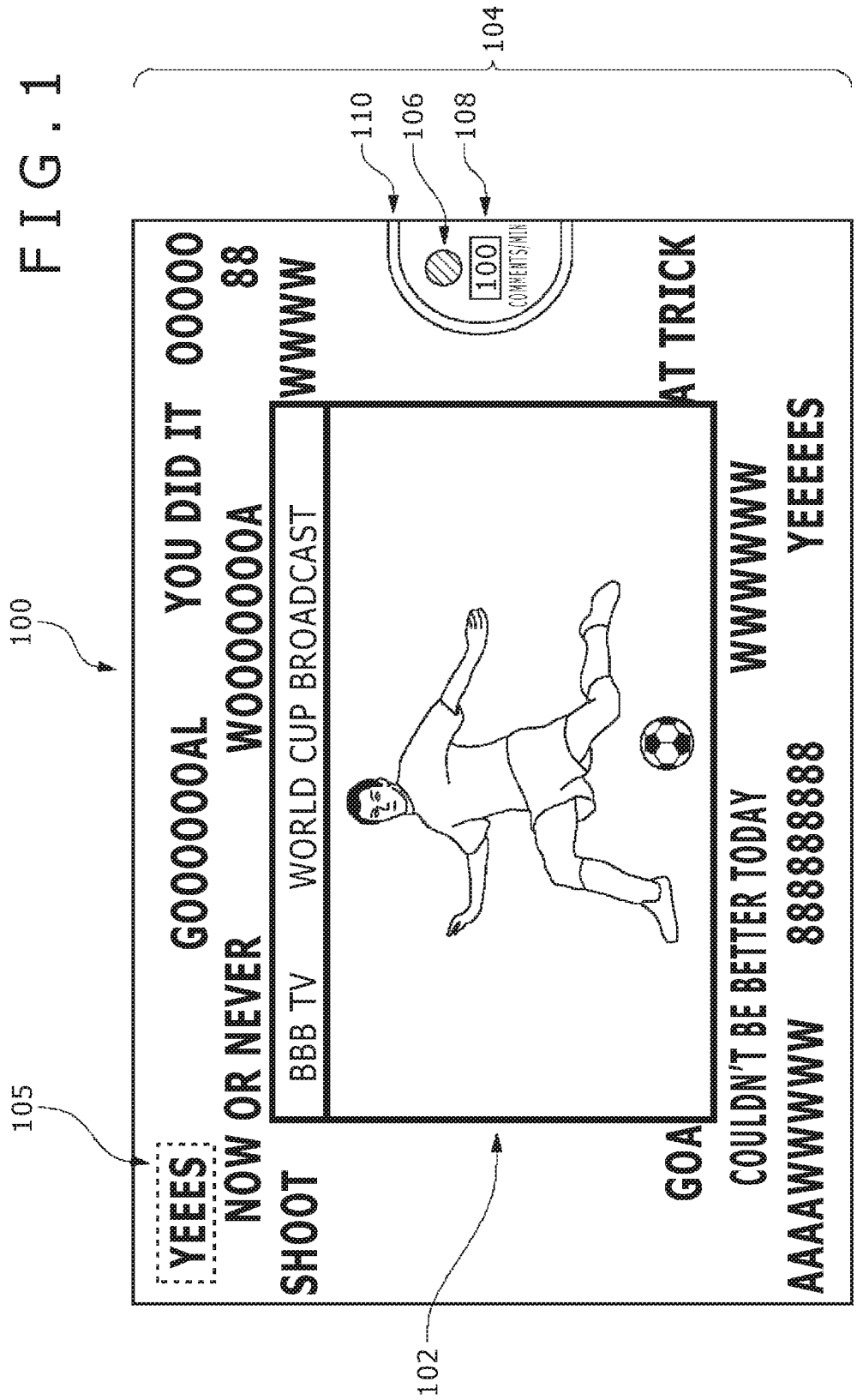
FIG. 1 is a schematic diagram showing a user interface of a program viewing system as one embodiment.

A program viewing system as one embodiment of the present invention is outlined below. FIG. 1 shows a user interface of the program viewing system as one embodiment. A viewing screen 100 includes a video display region 102 and a comment display region 104. The video display region 102 displays diverse kinds of video and moving image content. Typically, the video display region 102 displays a currently broadcast program or a recorded program being reproduced. The viewing screen 100 excluding the video display region 102 constitutes the comment display region 104.

The comment display region 104 provides right-to-left scroll display of the comments corresponding to the video content displayed in the video display region 102. For example, the comment display region 104 displays the comments posted by other viewers currently viewing the program being displayed in the video display region 102, or the comments posted by other viewers having viewed the recorded program currently displayed in the video display region 102, the postings having been made to a predetermined website (also called the "posting site" hereunder).

A comment is a character string input by each viewer in a single posting. In other words, a comment is a character string transmitted to the posting site as a single post. In the ensuing description, the wording "characters" is assumed to include, for example, signs, marks, symbols, pictorial symbols (emojis), and numerical characters that represent meanings when combined with various languages. For instance, a character string indicated by a comment 105 in FIG. 1 constitutes a single comment. The comments are character strings that express the impressions and feelings harbored individually by various viewers in diverse locations at a given point in time regarding part or all of the scenes making up the same video content. Some comments may be messages to other viewers or responses to the comments posted by other viewers.

The comment display region 104 displays a posting site symbol 106 representing a predetermined posting site and indicating that this region displays posted comments. The comment display region 104 also includes a comment count indicator 108. The comment count indicator 108 indicates the number of comments posted to the posting site in a predetermined unit time. In other words, the comment count indicator 108 presents the user with the number of the comments acquired from the posting site in the predetermined unit time, using numerical values and an indicator frame 110.

As shown in FIG. 1, the video display region 102 and the comment display region 104 are clearly distinguished from each other on the viewing screen 100 of the program viewing system as one embodiment. The comments scrolled in the comment display region 104 are displayed when they do not overlap with the video display region 102 and are hidden when they overlap with the video display region 102.

When one viewing screen 100 displays both video content and comments simultaneously as described above, the user is presented with the comments posted by other viewers and specific scenes of the video content mentioned in the comments in a mutually associated manner (i.e., in unified fashion). This makes it easy for the user to check both the video content and the comments associated with the individual scenes of the video content at the same time. The user is thus offered a novel experience in viewing the video content. Because there is no visual overlap between the video content and the comments, the integrity of the video content is maintained.

Figure 2:
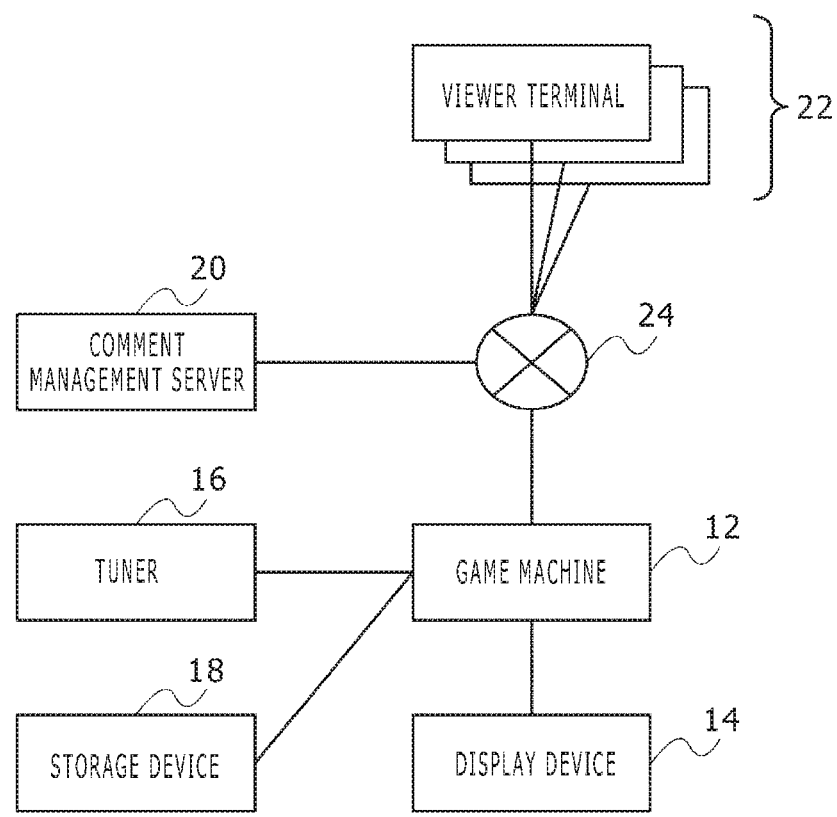
FIG. 2 is a schematic diagram showing a configuration of the program viewing system as one embodiment.

FIG. 2 shows a configuration of the program viewing system 10 as one embodiment. The program viewing system 10 includes a game machine 12, a display device 14, a tuner 16, and a storage device 18. Typically, these devices are installed in the user's home. The game machine 12 is an information processing device that executes diverse application software such as video games and causes the display device 14 to display the result of the execution. The game machine 12 may be a stationary game console or a handheld video game machine formed integrally with the display device 14. The functions of the game machine 12, to be explained below, may be implemented by diverse information processing devices including PCs, smartphones, and tablet terminals.

The storage device 18 stores electronic data of pieces of video and moving image content such as previously broadcast programs (called the "video recording data" hereunder). The storage device 18 outputs to the game machine 12 the video recording data selected by the user of the game machine 12. The video recording data handled by the embodiment includes broadcast dates and times of video content (e.g., programs), their recording times, and video content identification information in addition to the video and audio data constituting the content. The video content identification information includes predetermined program codes, names of broadcasters, and titles (e.g., names of programs), for example. The storage device 18 and the game machine 12 are interconnected via a LAN, for example.

The tuner 16 acquires a broadcast signal which is received by a suitable antenna or transmitted from a cable television station and of which the channel has been selected by the user of the game machine 12. The tuner 16 decodes the acquired broadcast signal into video data and outputs the video data to the game machine 12. The tuner 16 and the game machine 12 are interconnected by a USB cable, for example. The information processing device including the game machine 12 may be formed integrally with the tuner 16. Also, the storage device 18 and tuner 16 may be formed as an integral device.

A viewer terminal 22 is operated by the viewer viewing diverse kinds of video content such as currently broadcast programs. For example, the viewer terminal 22 may be a PC, a smartphone, or a tablet terminal. A plurality of viewer terminals 22 transmit comment data of their viewers individually to a comment management server 20 for registration. In other words, the viewer terminals 22 upload comments to a website provided by the comment management server 20. In the ensuing description, the act of transmitting a comment to the comment management server 20 for registration with the comment management server 20 will be referred to as a "post" or "posting." Another game machine having the same structure as the game machine 12 may also post comments. In that case, the other game machine is regarded as a viewer terminal 22.

The comment management server 20 functions as a web server that keeps the posting site public on the Internet. The comment management server 20 receives comments uploaded to the posting site from a plurality of viewer terminals 22. The comment management server 20 proceeds to distribute the received comments to the viewer terminals 22 currently accessing the posting site so that the viewer terminals 22 can display the posted comments. The posting site may be a video-sharing site, a miniblog/microblog site, or a bulletin board site, for example. The comment management server 20 holds the comments posted from a plurality of viewer terminals 22 in association with the programs or the broadcasters (broadcasting stations) targeted by the posts.

The game machine 12 is connected to the comment management server 20 via communication networks 24 including a LAN, a WAN, and the Internet. As with the viewer terminal 22, the game machine 12 functions as a web client. That is, the game machine 12 acquires the comment data provided by the comment management server 20 and displays the acquired comments on the viewing screen 100 shown in FIG. 1.

Figure 3:
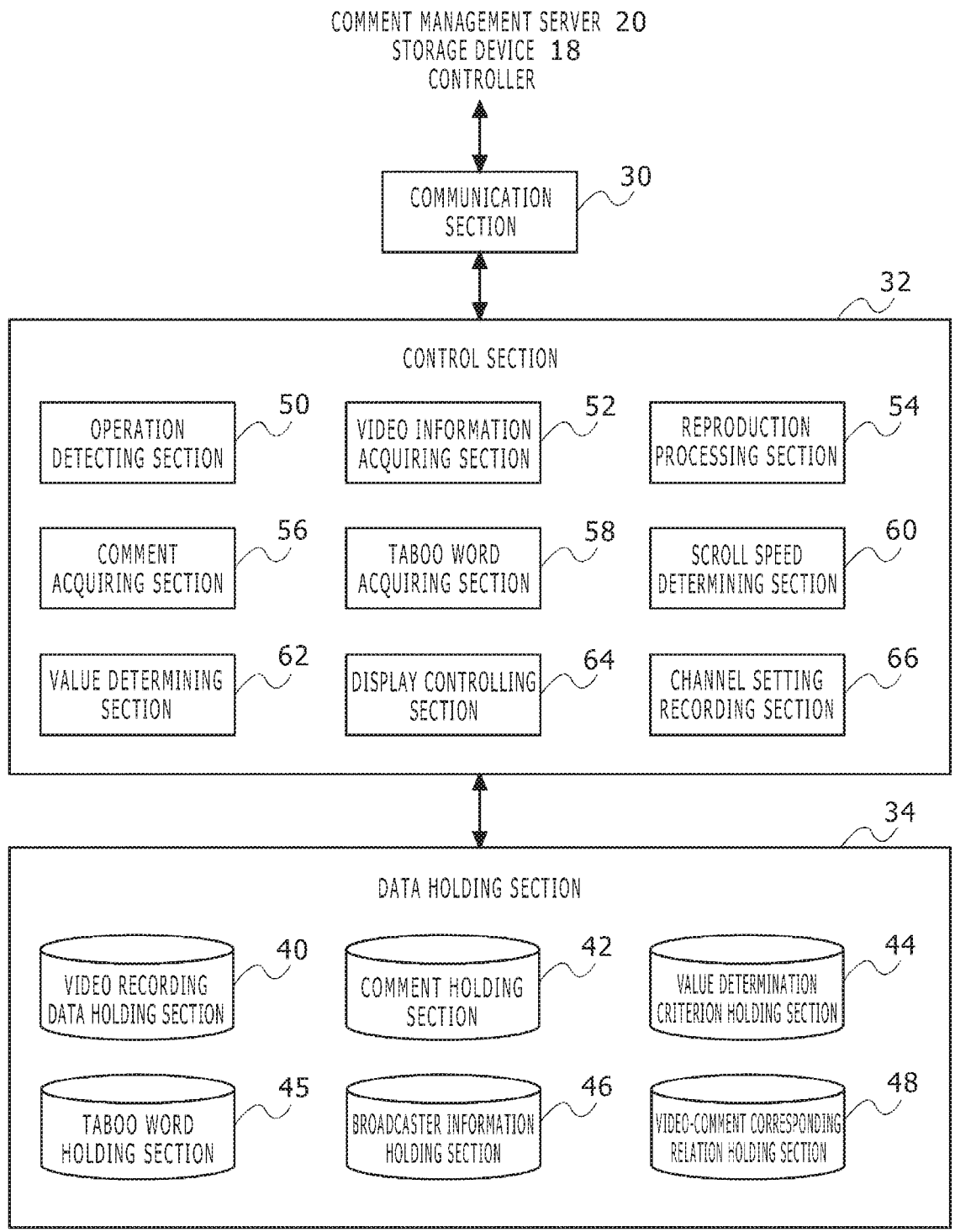
FIG. 3 is a block diagram showing a functional structure of a game machine found in FIG. 2.

FIG. 3 is a block diagram showing a functional structure of the game machine 12 found in FIG. 2. The game machine 12 has a communication section 30, a control section 32, and a data holding section 34. The communication section 30 communicates with an external device via the communication network 24 in accordance with a predetermined communication protocol. For example, the communication section 30 transmits and receives diverse data to and from the storage device 18 and the comment management server 20 found in FIG. 1, as well as to and from a controller, not shown. The control section 32 executes and controls various data processes. The data holding section 34 is a storage region that stores diverse data.

Each of the functional blocks discussed in this description may be implemented by hardware such as devices and electronic circuits typified by a CPU and a memory of a computer as well as mechanical equipment, or by software such as computer programs and other arrangements. The functional blocks described here are implemented by combination of both hardware and software. It will thus be understood by those skilled in the art that the functional blocks are implemented in diverse forms with hardware and software combined.

For example, the user may be offered a recording medium that stores a television viewing and recording application including the program modules corresponding to the functional blocks making up the control section 32. The television viewing and recording application may be installed into the storage of the game machine 12 by means of the recording medium. The functions of the control section 32 may then be exerted by the CPU or a GPU of the game machine 12 reading the appropriate program modules from the television viewing and recording application into main memory for execution. The functional blocks of the data holding section 34 may be implemented by the storage device such as storage or main memory that stores the data.

The data holding section 34 includes a video recording data holding section 40, a comment holding section 42, a value determination criterion holding section 44, a taboo word holding section 45, a broadcaster information holding section 46, and a video-comment corresponding relation holding section 48.

The video recording data holding section 40 holds the video recording data of video content. For example, the video recording data holding section 40 holds the video recording data including the video and audio data of the programs that were broadcast in the past. The comment holding section 42 holds the comment data acquired from the comment management server 20. Typically, the comment holding section 42 is implemented by a volatile memory temporarily storing the comment data.

The value determination criterion holding section 44 holds data constituting the criteria for determining whether each comment acquired from the comment management server 20 is a comment of low value, i.e., the rules for identifying low-value comments. The data held by the value determination criterion holding section 44 includes a dictionary that holds key words and key phrases indicative of the character strings to be determined as low-value comments. The key words and key phrases may be set as needed by the user or may be established in advance by the developers of the television viewing and recording application on the basis of their findings and experiences.

The taboo word holding section 45 holds the taboo words acquired by a taboo word acquiring section 58, to be discussed later. The taboo words are also known as "NG words" or "Bad words" representative of comments that should not appear on the viewing screen 100. In this embodiment, the taboo words are defined beforehand by the comment management server 20. Alternatively, the user of the game machine 12 may register the taboo words beforehand with the comment management server 20.

The broadcaster information holding section 46 holds information about the broadcasters that broadcast programs, i.e., information about broadcasting stations. The information held by the broadcaster information holding section 46 includes information indicating the relations between a plurality of broadcasters in terms of affiliations therebetween. In other words, the broadcaster information holding section 46 holds information about each broadcaster in affiliated relation with other broadcasters on the same broadcasting network. For example, the information held about a given local broadcasting station indicates its affiliation with the main broadcaster (known as the key station) that assumes the leadership of the broadcasting network to which that local broadcasting station belongs. In other words, the broadcaster information holding section 46 holds the corresponding relations between the key and the local stations as the information indicative of the relations between a plurality of broadcasters.

The video-comment corresponding relation holding section 48 holds information indicating the corresponding relations between the channel of which the number has been determined by the game machine 12, a broadcaster offering the video of the program to be displayed on the channel thus determined, and another broadcaster as the destination to which to post comments that are to be displayed along with the program video. In the ensuing description, the former broadcaster will be referred to as the "video offering station" and the latter broadcaster as the "comment destination station." The comment destination station is a broadcaster that broadcasts the program being actually viewed by the viewers who may post comments.

Usually, the video offering station and the comment destination station are set to be one and the same. If the comment management server 20 does not receive comments targeted for the program broadcast by the video offering station, i.e., if the game machine 12 cannot acquire comments about the program broadcast by the video offering station, the video offering station and the comment destination station are set to be different. For example, a local station (e.g., a television station of a particular locality) may be designated as the video offering station, and the key station of the broadcasting network to which the local station belongs may be designated as the comment destination station.

The control section 32 includes an operation detecting section 50, a video information acquiring section 52, a reproduction processing section 54, a comment acquiring section 56, a taboo word acquiring section 58, a scroll speed determining section 60, a value determining section 62, a display controlling section 64, and a channel setting recording section 66.

The operation detecting section 50 detects the user's operation that is input to a controller of the game machine 12 via the communication section 30. The operation detecting section 50 transfers to each functional block the information representing the specifics of the operation thus input by the user. The video information acquiring section 52 transmits the channel information selected by the user to the tuner 16. The video information acquiring section 52 receives the video data of the broadcast program transmitted from the tuner 16, and transfers the received video data to the display controlling section 64.

The reproduction processing section 54 acquires the video recording data of the video content selected by the user from among the video recording data of the video content held in the storage device 18 or in the video recording data holding section 40. The reproduction processing section 54 reproduces (reconstitutes) the video data of the video content by executing known reproduction processes on the acquired video data, and transfers the reproduced video data to the display controlling section 64.

The comment acquiring section 56 acquires from the comment management server 20 the data of the comments posted with regard to the video content displayed on the viewing screen 100. The comment acquiring section 56 proceeds to store the acquired comment data into the comment holding section 42. As will be discussed later, the comment data includes a comment text describing the impression harbored by each posting viewer and the date and time at which the posting was made. The comment acquiring section 56 may alternatively acquire the comment data by transmitting a comment offering request to the comment management server 20 via a comment offering API provided to external devices by the comment management server 20.

For example, if the comment management server 20 provides a streaming API, the streaming API may be called by designating the broadcaster acting as the destination for comments. In this case, upon receiving the posting of a comment, the comment management server 20 may be arranged to automatically transmit the comment to the game machine 12. If the comment management server 20 provides a search API, a search request designating the broadcaster serving as the comment destination may be transmitted periodically to the comment management server 20. This will make it possible to periodically acquire from the comment management server 20 the comments posted to the comment management server 20.

When the video of a currently broadcast program is displayed on the viewing screen 100, the comment acquiring section 56 references the corresponding relation information held in the video-comment corresponding relation holding section 48 and thereby identifies the comment destination station associated with the channel selected by the user. In other words, the comment acquiring section 56 identifies the comment destination station associated with the video offering station broadcasting the program to be displayed on the viewing screen 100. The comment acquiring section 56 transmits to the comment management server 20 a comment offering request designating the comment destination station thus identified. As mentioned above, the video offering station and the comment destination station are usually one and the same. Thus the comment acquiring section 56 typically transmits to the comment management server 20 the comment offering request designating the broadcasting station of the program of which the video is to be displayed on the viewing screen 100.

When the reproduced video of a recorded program is to be displayed on the viewing screen 100, the comment acquiring section 56 identifies program identification information recorded in the video recording data to be reproduced, such as the broadcaster name, date and time of broadcast, and program title. The comment acquiring section 56 transmits to the comment management server 20 a comment offering request designating the identification information thus identified about the program to be reproduced. The comment acquiring section 56 may collectively acquire all comments posted with regard to the recorded program. Alternatively, as in acquiring comments about a currently broadcast program, the comment acquiring section 56 may acquire a plurality of comments about the recorded program in installments in chronological order of comment posting dates and times. For example, the comment acquiring section 56 may acquire comments periodically, such as at intervals of one minute.

In a variation of this embodiment, as when the video of a currently broadcast program is displayed, the comment acquiring section 56 may identify the comment destination station associated with the broadcaster recorded in the video recording data (i.e., video offering station) in accordance with the corresponding relation information held in the video-comment corresponding relation holding section 48. The comment acquiring section 56 may proceed to transmit to the comment management server 20 a comment offering request designating the comment destination station as the broadcaster.

The taboo word acquiring section 58 acquires from the comment management server 20 the character strings registered therein as taboo words, i.e., the key words and key phrases representative of the taboo words. The taboo word acquiring section 58 stores the acquired key words and key phrases into the taboo word holding section 45.

The scroll speed determining section 60 determines the speed at which the comments held in the comment holding section 42 are to be scrolled. The larger the display size of a comment, the higher the scroll speed determined for the comment by the scroll speed determining section 60. The larger the number of the characters making up a comment text, i.e., the larger the number of the characters written by the posting viewer in the comment, the larger the display size of the comment becomes. Also, the larger the display size of each character in the comment text, i.e., the larger the character size set for the comment by the posting viewer, the larger the display size of the comment turns out to be.

Figure 4:
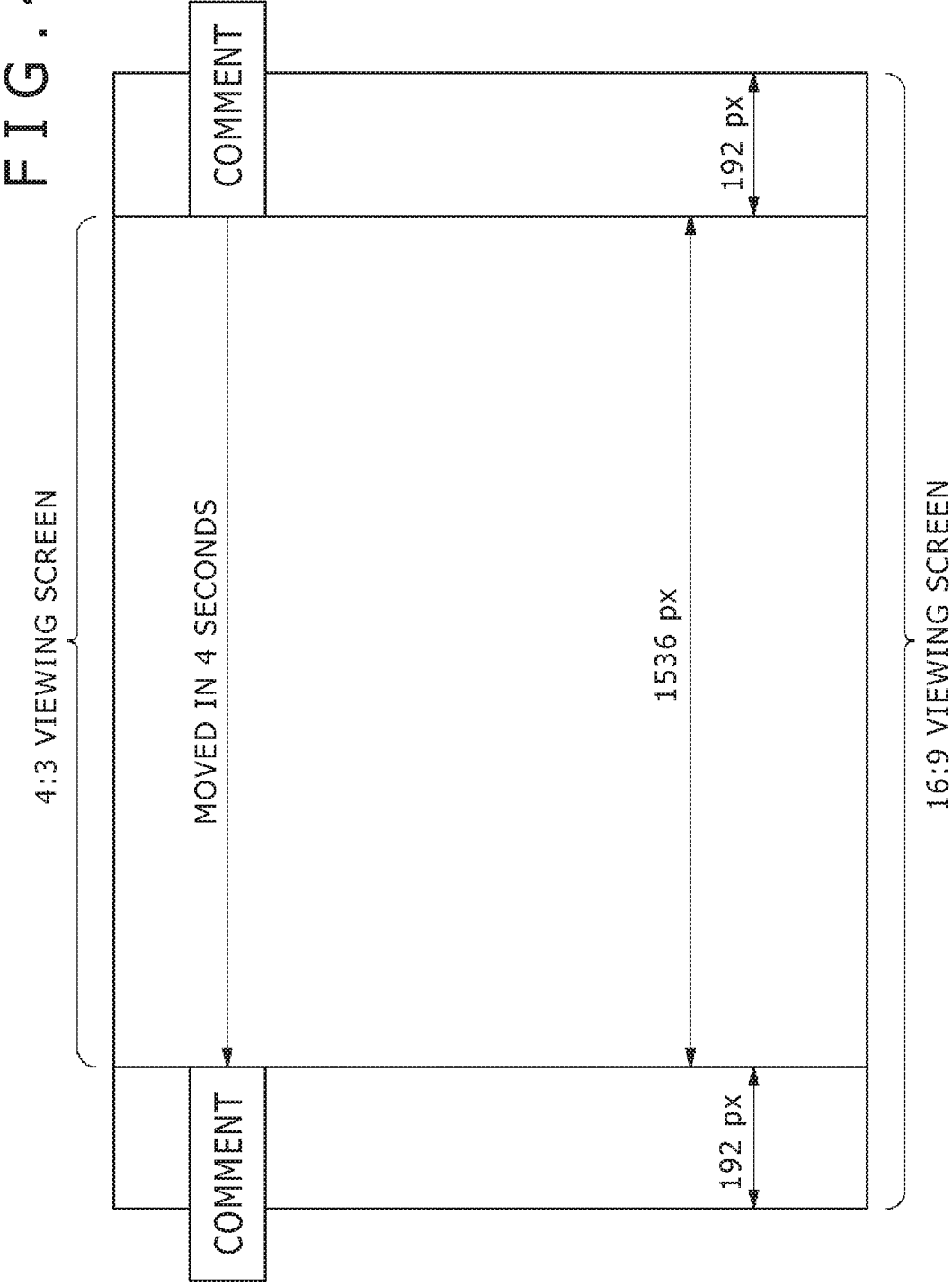
FIG. 4 is a schematic diagram illustrating the logic for determining a scroll speed.

FIG. 4 schematically illustrates the logic for determining the scroll speed. Whereas the aspect ratio of the viewing screen 100 in this embodiment is 16:9, the scroll speed is calculated on the basis of the aspect ratio being 4:3. The scroll speed determining section 60 determines the scroll speed for a given comment in such a manner that it will take four seconds after the comment is started to be displayed at one end of the 4:3 viewing screen until the displaying of the comment is ended at another end of the 4:3 viewing screen regardless of the display size of the comment.

Specifically, the scroll speed determining section 60 determines the amount of pixel movement per frame using the calculation formula shown below. The frame rate is assumed to be 60 fps.

$$(1536 \text{ px} + \text{display size of entire comment text})/(4 \text{ seconds} \times 60 \text{ frames})$$

Because the aspect ratio of the viewing screen 100 in this embodiment is 16:9, the comment display time is made longer than four seconds in practice to allow for the right and left margins shown in FIG. 4.

When the reproduced video of a recorded program is displayed on the viewing screen 100, the scroll speed determining section 60 adjusts the scroll speed determined for the moment on the basis of the comment display size in keeping with the speed of ongoing video reproduction. Specifically, the higher the reproduction speed, the higher the scroll speed is set; the lower the reproduction speed, the lower the scroll speed is set. For example, during normal reproduction, the adjustment is skipped. During fast-forward reproduction (at 1.1 to 1.5 times the normal speed), the scroll speed is raised to 1.1 to 1.5 times the initially determined speed. During slow-forward or frame-by-frame reproduction, the scroll speed is lowered in keeping with the reduced reproduction speed.

Returning to FIG. 3, the value determining section 62 determines whether the comment acquired from the comment management server 20 is to be lower in screen display priority than other comments (the comment will be referred to as a "low-value comment" hereunder) in accordance with the criteria held in the value determination criterion holding section 44. The "other comments" above which are determined to be higher in screen display priority than the low-value comment (i.e., which are not determined each to be a low-value comment) will be referred to as the "ordinary comments" hereunder. It may be said that the low-value comment is less meaningful for viewing by the user than the ordinary comments. The low-value comment may be considered to have a lower value than the ordinary comments for display on the screen. As such, the low-value comment is considered unworthy of display.

When a comment has at least a predetermined number of identical characters or symbols written consecutively therein, the value determining section 62 determines the comment to be a low-value comment. For example, any comment having at least four identical characters or symbols written in a row, such as "GOOOOAL," may be determined to be a low-value comment. In a given language, any comment having at least a predetermined number of identical vowels (e.g., "a," "i," "u," "e," or "o") written consecutively therein may be determined to be a low-value comment.

Having sampled numerous comments, the inventors have found that a comment in which the third and the fourth characters are identical, such as "GOOOOOOOAL" or "YEEEEEEES" is highly likely to be a low-value comment. Thus, as part of the comments in which at least the predetermined number of identical characters or symbols are written consecutively, the value determining section 62 determines as a low-value comment any comment in which the third and the fourth characters or symbols are the same. This arrangement allows low-value comments to be identified efficiently and accurately. As described above, on the basis of comment characteristics specific to a given language, it is acceptable to determine as a low-value comment any comment in which at least a predetermined number of identical characters or symbols are written consecutively starting from a predetermined character position relative to the beginning of the comment (i.e., a predetermined number of characters away from the beginning).

Also, if at least two of a plurality of comments acquired by the comment acquiring section 56 within a predetermined time period are identical in content, the value determining section 62 determines at least one of the comments to be a low-value comment. In other words, if there occur identical content comments frequently in the same time period, at least one of these comments is determined to be a low-value comment. For example, only one of a plurality of the identical content comments may be determined to be an ordinary comment, with the remaining comments all determined to be low-value comments.

The identical content comments may be comments whose character strings exactly match with one another, comments in which at least a predetermined number of characters (e.g., four characters) from the beginning match with one another, or a combination of these comments. In practice, only one of the identical content comments needs to be displayed to convey the meaning of the comments to the user. The identical content comments are thus determined to be low-value comments, while the other comments each conveying a different meaning are determined to be ordinary comments. This relatively boosts the display priority of the other comments conveying different meanings.

The value determining section 62 further determines a single-character comment (e.g., "A" or "w") to be a low-value comment. That is because one-character comments are often meaningless. Also, the value determining section 62 determines a comment of 40 consecutive characters or more to be a low-value comment. Such comments are typically created by continuously holding down keys and they often turn out to be meaningless.

Furthermore, the value determining section 62 references the low-value comment dictionary held in the value determination criterion holding section 44 and thereby determines as a low-value comment any comment that includes a key word or a key phrase indicative of a low-value comment. In a variation of this embodiment, the value determining section 62 may determine as a low-value comment any comment that exactly matches any key word or key phrase indicative of a low-value comment. This makes it possible to identify low-value comments with high precision in a manner reflecting the findings and experiences of the user and the developers.

The display controlling section 64 controls the display of the viewing screen 100. For example, the display controlling section 64 writes to a VRAM the image data for the viewing screen 100 including the video of the program and the comments to be displayed on the viewing screen 100. Using the image data thus written, a display controller causes the display device 14 to display the viewing screen 100 that includes the program video and the comments. The channel setting recording section 66 stores into the video-comment corresponding relation holding section 48 the corresponding relations which exist between the video offering station and the comment destination station and which have been input to a channel setting screen, to be discussed later.

Figure 5:
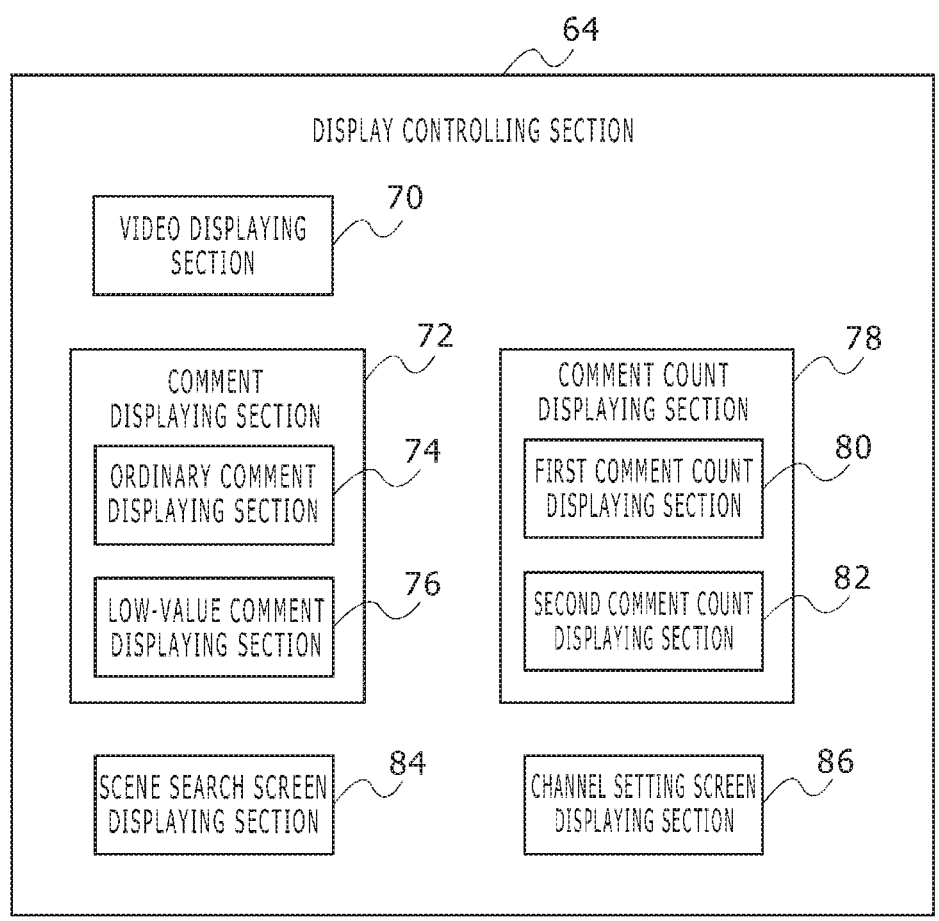
FIG. 5 is a block diagram detailing a display controlling section found in FIG. 3.

FIG. 5 is a block diagram detailing the display controlling section 64 found in FIG. 3. The display controlling section 64 includes a video displaying section 70, a comment displaying section 72, a comment count displaying section 78, a scene search screen displaying section 84, and a channel setting screen displaying section 86.

The video displaying section 70 causes the video display region 102 on the viewing screen 100 to display the video data of a currently broadcast program acquired by the video information acquiring section 52. The video displaying section 70 also causes the video display region 102 on the viewing screen 100 to display the video data of a recorded program reproduced by the reproduction processing section 54. As shown in FIG. 1, the video displaying section 70 further causes the video display region 102 to display the name of the broadcasting station and the title of the program.

Figure 6:
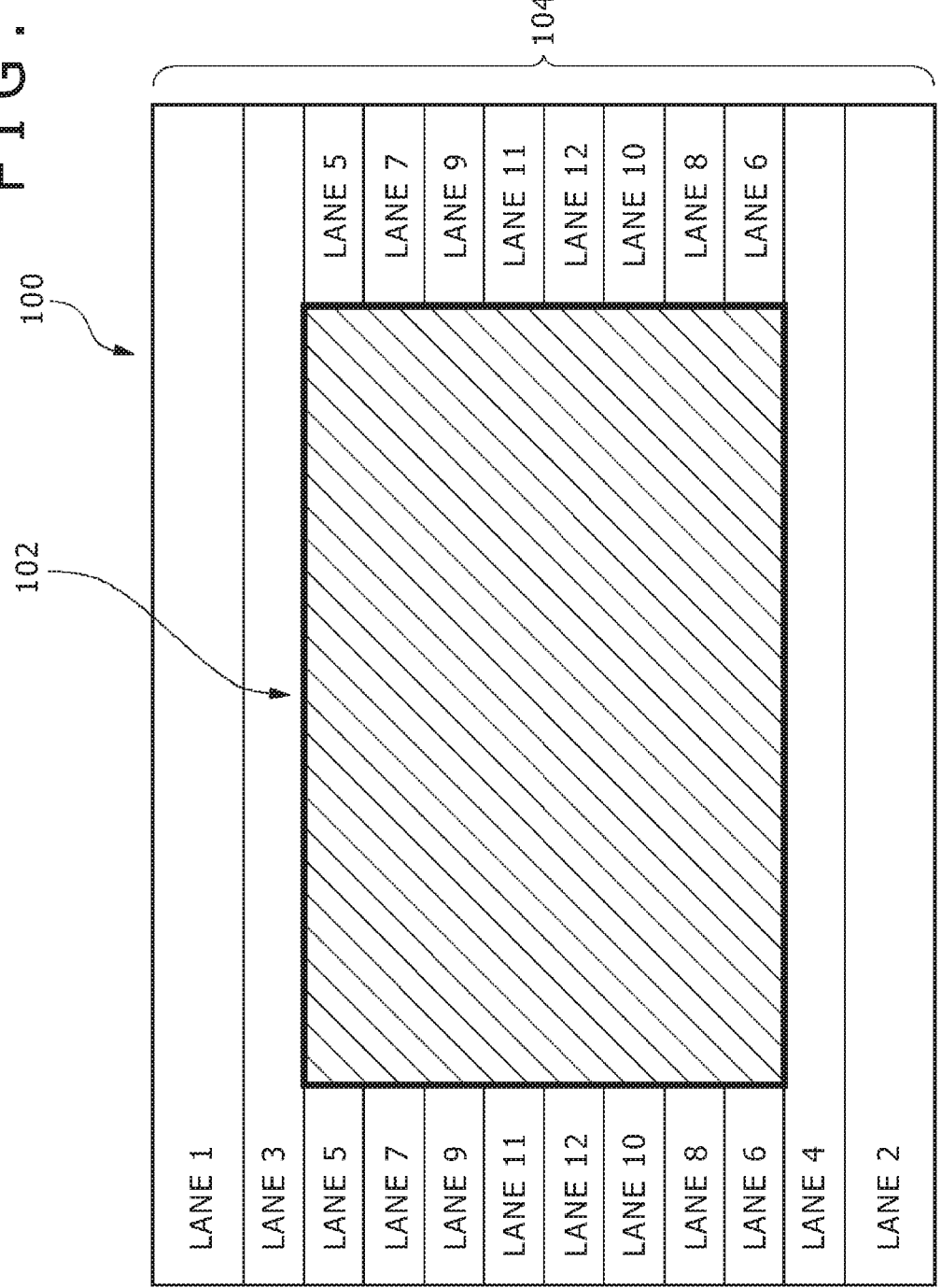
FIG. 6 is a schematic diagram showing a plurality of lanes provided in a comment display region.

The comment displaying section 72 causes the comment display region 104 on the viewing screen 100 to display the comment data acquired by the comment acquiring section 56. FIG. 6 shows a plurality of lanes provided in the comment display region 104. The comment displaying section 72 manages the comment display region 104 divided into 12 lanes (i.e., 12 lines). Each lane, not visibly delineated on the screen, serves as a region for laterally scrolling comments in a row. Lanes 1 to 4 in FIG. 6 do not overlap with the video display region 102. Lanes 5 to 12 partially overlap with the video display region 102.

The comment displaying section 72 includes an ordinary comment displaying section 74 configured to control the display of ordinary comments and a low-value comment displaying section 76 configured to control the display of low-value comments. As will be discussed later in more detail, every comment acquired is treated as an ordinary comment as long as its amount is less than a predetermined amount.

The ordinary comment displaying section 74 provides right-to-left scrolling of ordinary comments in the comment display region 104, the ordinary comments being acquired by the comment acquiring section 56 with the exception of those determined to be low-value comments by the value determining section 62. The ordinary comment displaying section 74, it should be noted, references the taboo words held in the taboo word holding section 45 and thereby determines whether each ordinary comment includes any taboo word. If an ordinary comment is determined to include a taboo word, the ordinary comment displaying section 74 skips the display of the comment and processes the next comment for display.

When scrolling ordinary comments, the ordinary comment displaying section 74 selects the lanes not overlapping with the video display region 102 in preference to the lanes overlapping with the video display region 102. Specifically, the ordinary comment displaying section 74 preferentially selects the lanes as far away from the video display region 102 as possible, i.e., lanes 1, 2, 3, . . . , 11 and 12, in that order. The ordinary comment displaying section 74 displays each of a plurality of ordinary comments in the lane selected for that comment. In this manner, the ordinary comment displaying section 74 displays up to 12 lines of ordinary comments in parallel.

The ordinary comment displaying section 74 scrolls each ordinary comment at the scroll speed determined by the scroll speed determining section 60 in a specifically selected lane. The ordinary comment displaying section 74 adjusts the timing to start scrolling each comment so that a plurality of comments will not overlap with one another when scrolled in the same lane. Specifically, if a comment is scrolled at a speed higher than that of the preceding comment, the ordinary comment displaying section 74 delays starting to scroll the ensuing comment so that the ensuing comment will not overtake the preceding comment.

Figure 7:
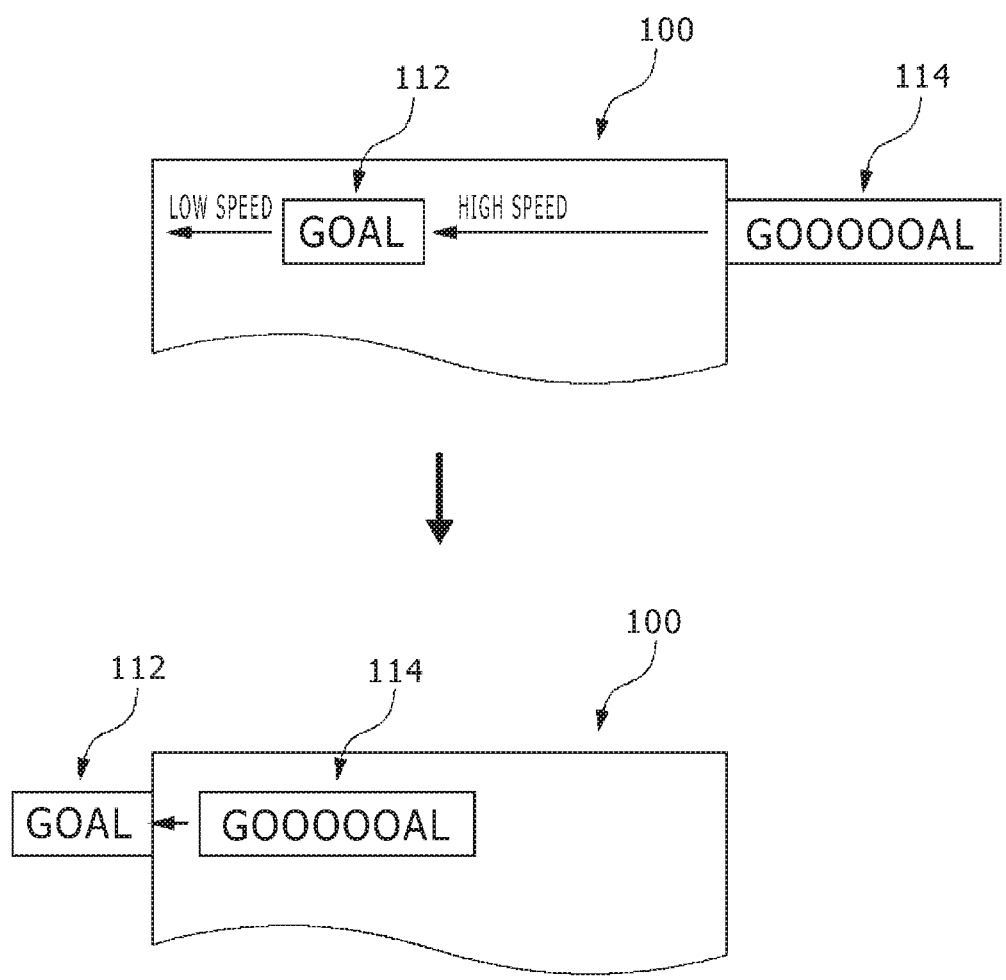
FIG. 7 is a schematic diagram illustrating how comments are scrolled.

FIG. 7 schematically illustrates how comments are scrolled. In this example, a comment 114 has more characters than a comment 112. For this reason, the scroll speed determining section 60 determines the scroll speed for the comment 114 to be higher than the scroll speed for the comment 112. On the basis of the difference between the scroll speed of the comment 112 and that of the comment 114, the ordinary comment displaying section 74 determines the amount of necessary delay such that the comment 114 will not overlap with the comment 112 before the display of the comment 112 comes to an end on the viewing screen 100.

For example, the amount of delay may be set to be equivalent to the distance between the end of the comment 112 and the beginning of the comment 114 in effect at the start of display of the comment 114. After the display of the comment 112 has started, the ordinary comment displaying section 74 allows for at least the amount of delay thus determined before starting to display the comment 114. For example, following the start of display of the comment 112, the display of the comment 114 may be started the moment the distance between the edge of the viewing screen 100 and the end of the comment 112 has exceeded the distance represented by the amount of delay.

As described above, the ordinary comment displaying section 74 selects the lanes for scrolling comments preferentially in ascending order of lane numbers (i.e., lanes 1, 2, 3, . . . , in that order). Suppose now that numerous comments have been acquired from the comment management server 20 within a predetermined time period (e.g., in a single acquiring process performed by the comment acquiring section 56). In such a case, constraints on the scroll speed and the delay in starting the scroll make it difficult for a single lane to display all comments in time. In other words, it would take longer from acquisition of a comment until the start of its display. The same problem will occur if a given comment has a large number of characters therein or if the character size of a given comment is large.

To bypass the above problem, the ordinary comment displaying section 74 selects the highest-priority lane from among the lanes not used so far as a lane for scrolling comments when the amount of acquired comments exceeds a predetermined amount (specifically, when the capacity necessary for displaying acquired comments exceeds a predetermined level). The amount of comments increases, for example, as the number of comments becomes larger, as the character string in each comment becomes longer, or as the character size of each comment becomes larger.

For example, suppose that while a comment is being scrolled in lane 1, a yet-to-be displayed comment is held in the comment holding section 42. In that case, the ordinary comment displaying section 74 determines whether the undisplayed comment can be displayed immediately in lane 1 in view of the scroll speed for that undisplayed comment. For instance, if immediately starting to scroll the undisplayed comment in lane 1 would let the comment overlap with the currently scrolled comment in the same lane, the ordinary comment displaying section 74 determines that the undisplayed comment cannot be displayed immediately in lane 1. In this case, the undisplayed comment is scrolled in lane 2, which is the lane having the second highest priority.

Also, suppose that with the comment 112 in FIG. 7 currently scrolled in lane 1 and with the comment 114 waiting to be scrolled, a new comment is placed into the comment holding section 42. In such a case, the ordinary comment displaying section 74 may scroll the new comment in lane 2.

If comments are being displayed in a plurality of lanes, the ordinary comment displaying section 74 checks each of the lanes in ascending order of lane numbers to find the available lane for scrolling the new comment immediately, starting with lane 1. When the available lane is found, the ordinary comment displaying section 74 starts to scroll the new comment in that lane. If none of the lanes currently displaying comments is available for scrolling the new comment (i.e., where the new comment has to wait), the ordinary comment displaying section 74 displays the new comment in the highest-priority lane selected from among the lanes not used so far.

As shown in FIG. 1, the comments scrolled in the comment display region 104 on the viewing screen 100 are hidden while overlapping with the video display region 102 in the course of the scrolling. In other words, the scrolled comments currently unobstructed from view are partially hidden when overlapping with the video display region 102 and are again displayed when coming out of the video display region 102.

The ordinary comment displaying section 74 displays comments when they do not overlap with the video display region 102 on the viewing screen 100, and hides from view the comments when they overlap with the video display region 102. Specifically, the ordinary comment displaying section 74 determines the position for drawing a comment in each frame of the viewing screen 100 in accordance with the scroll speed for the comment. When at least part of the comment drawing position is included in the drawing range of the video display region 102, the ordinary comment displaying section 74 hides (i.e., does not draw in the frames) that image portion of the comment character string which portion is included in the drawing range of the video display region 102. The ordinary comment displaying section 74 displays (i.e., draws in the frames) only that image portion of the comment character string which portion is not included in the drawing range of the video display region 102.

With this embodiment, the comments subject to the process of hiding them are those scrolled in lanes 3 to 12. The ordinary comment displaying section 74 may continue the process of scrolling the comments in lanes 3 to 12 behind the currently displayed video in the video display region 102 (i.e., in a subordinate layer hidden from view). The video information acquiring section 52 displays the video content in the video display region 102 with a transmission factor of zero. In this manner, the comments overlapping with the video display region 102 may be hidden from view.

Returning to FIG. 5, the low-value comment displaying section 76 provides in the comment display region 104 right-to-left scrolling of low-value comments that have been determined as such by the value determining section 62 from among the comments acquired by the comment acquiring section 56. As with the ordinary comment displaying section 74, the low-value comment displaying section 76 determines whether each low-value comment includes any taboo word. If a given low-value comment is determined to include a taboo word, the low-value comment displaying section 76 skips the display of that comment and processes the next comment for display.

As with the ordinary comment displaying section 74, the low-value comment displaying section 76 scrolls low-value comments at the scroll speed determined by the scroll speed determining section 60. If any portion of the currently scrolled low-value comment overlaps with the video display region 102, the low-value comment displaying section 76 hides the overlapping portion of the character string in the low-value comment.

Figure 8:
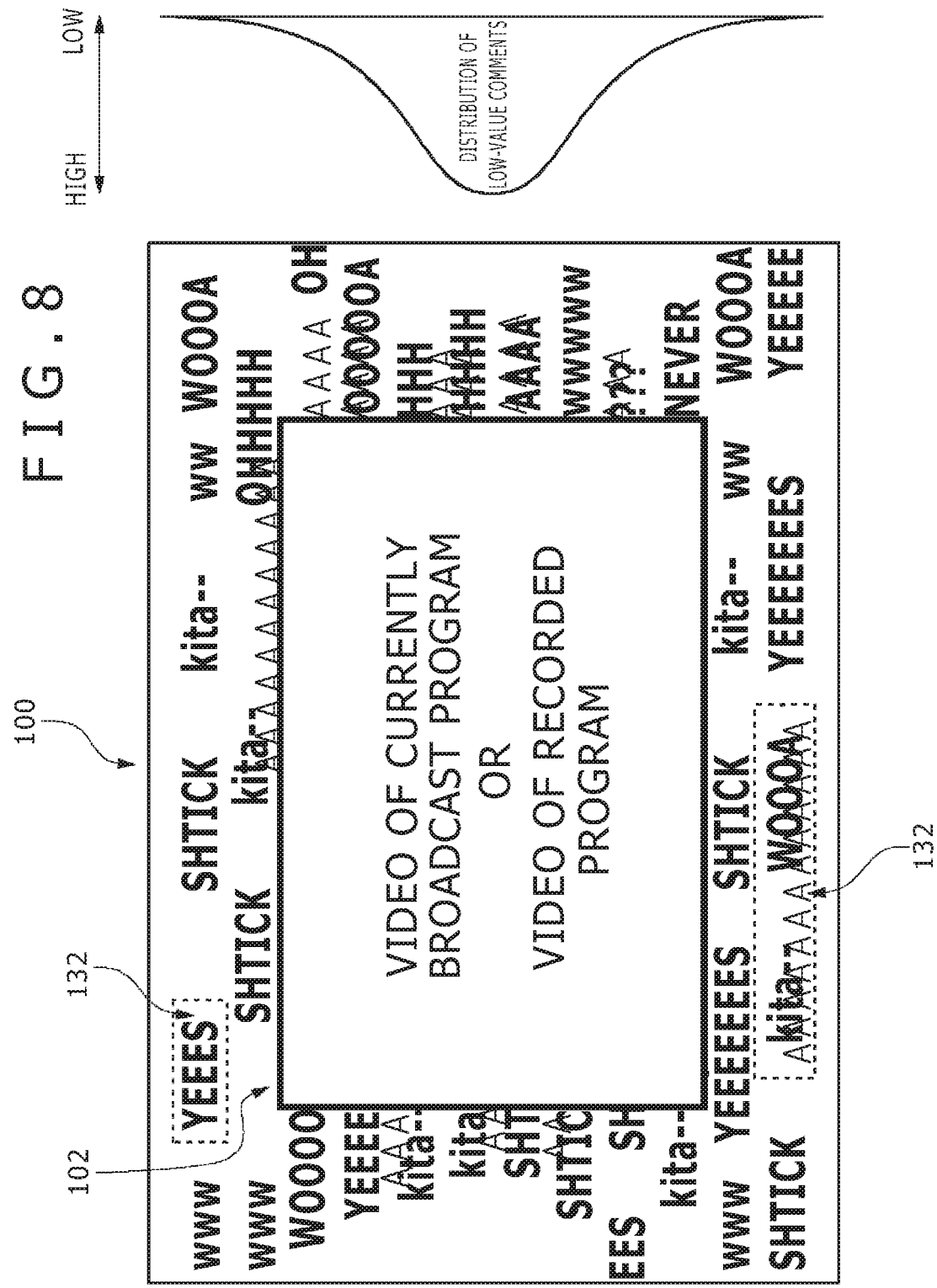
FIG. 8 is a schematic diagram showing a viewing screen.

FIG. 8 shows a typical viewing screen 100. The ordinary comment displaying section 74 displays ordinary comments 132 in a relatively prominent manner (e.g., in deep black). The low-value comment displaying section 76, on the other hand, displays low-value comments 134 in a relatively inconspicuous manner (e.g., in light grey). Alternatively, the low-value comment displaying section 76 may display the low-value comments 134 in a color higher in brightness and lower in intensity (i.e., fainter and lighter) than the ordinary comments 132. As another alternative, the low-value comment displaying section 76 may display the low-value comments 134 behind the ordinary comments 132. The low-value comment displaying section 76 may also display the low-value comments 134 with a predetermined transmission factor.

As described above, the ordinary comment displaying section 74 displays the ordinary comments in lanes in a manner not overlapping with one another. The ordinary comment displaying section 74 further selects preferentially the lanes not overlapping with the video display region 102 as the comment display region. Meanwhile, the low-value comment displaying section 76 displays the low-value comments regardless of lanes in a manner allowed to overlap with one another and with ordinary comments. The low-value comment displaying section 76 selects a region partially overlapping with the video display region 102 as its comment display region.

Specifically, the low-value comment displaying section 76 selects with high probability a region partially overlapping with the video display region 102, i.e., a region partially hidden from view by the video display region 102, as the region in which to scroll low-value comments. For example, the low-value comment displaying section 76 determines with a predetermined probability a scroll region for each of individual low-value comments in such a manner that the determined scroll regions will be distributed as shown in FIG. 8. The low-value comment displaying section 76 determines the scroll region for a given low-value comment in a manner excluding from its parameters both the scroll positions (i.e., lanes) for ordinary comments and the scroll region for other low-value comments. Consequently, as shown in FIG. 8, each low-value comment may be displayed in a manner overlapping with ordinary comments as well as with other low-value comments.

The value determining section 62 starts to determine any low-value comment when the amount of the comments acquired by the comment acquiring section 56 (in terms of the number of comments, number of characters in each comment, and character size) has exceeded a predetermined amount, causing comments to wait for display in all of the 12 lanes of the comment display region 104. Although the third and the fourth characters are the same in the comment character string indicated by the ordinary comment 132 in FIG. 8, the comment is displayed as an ordinary comment in lane 1 because the lane is available for display. The comment character string indicated by the low-value comment 134 in FIG. 8, on the other hand, is determined to be a low-value comment because all lanes are being used for comment display.

As described above, the video recording data of the video content such as previously broadcast programs has the individual pieces of content associated with the dates and times at which the pieces of content were broadcast. Also, the comment data acquired by the comment acquiring section 56 and offered to the game machine 12 by the comment management server 20 has the individual comments associated with the dates and times at which the comments were posted to the comment management server 20. FIG. 9 shows a typical data structure of comments. Each comment data item in FIG. 9 is associated with a comment text and the date and time at which the comment was posted, the text being a character string indicative of the content of the comment input by the viewer.

The process of determining a low-value comment during reproduction of recorded video content, the process of displaying ordinary comments during that time period, and the process of displaying low-value comments in that time period are the same as those carried out when currently broadcast video content is displayed. What follows is an explanation of the process performed by the ordinary comment displaying section 74 and characteristic of the reproduction of recorded video content. The process is substantially the same as that performed by the low-value comment displaying section 76.

When the video of currently reproduced video content in effect at a given point in time is displayed, the ordinary comment displaying section 74 starts to scroll the comment associated with the time information indicative of that time point. Specifically, the ordinary comment displaying section 74 first acquires the time information about the video reproduced by the reproduction processing section 54 and displayed on the viewing screen 100, the time information being the elapsed time from the beginning of the reproduction for example. On the basis of the elapsed time and the program start time recorded in the video recording data, the ordinary comment displaying section 74 identifies the time at which the currently displayed video was actually broadcast. From among the comments acquired from the comment management server 20, the ordinary comment displaying section 74 identifies the comment whose posting time matches the time at which the video currently displayed in the video display region 102 was actually broadcast, and starts to display the identified comment.

Figure 10:
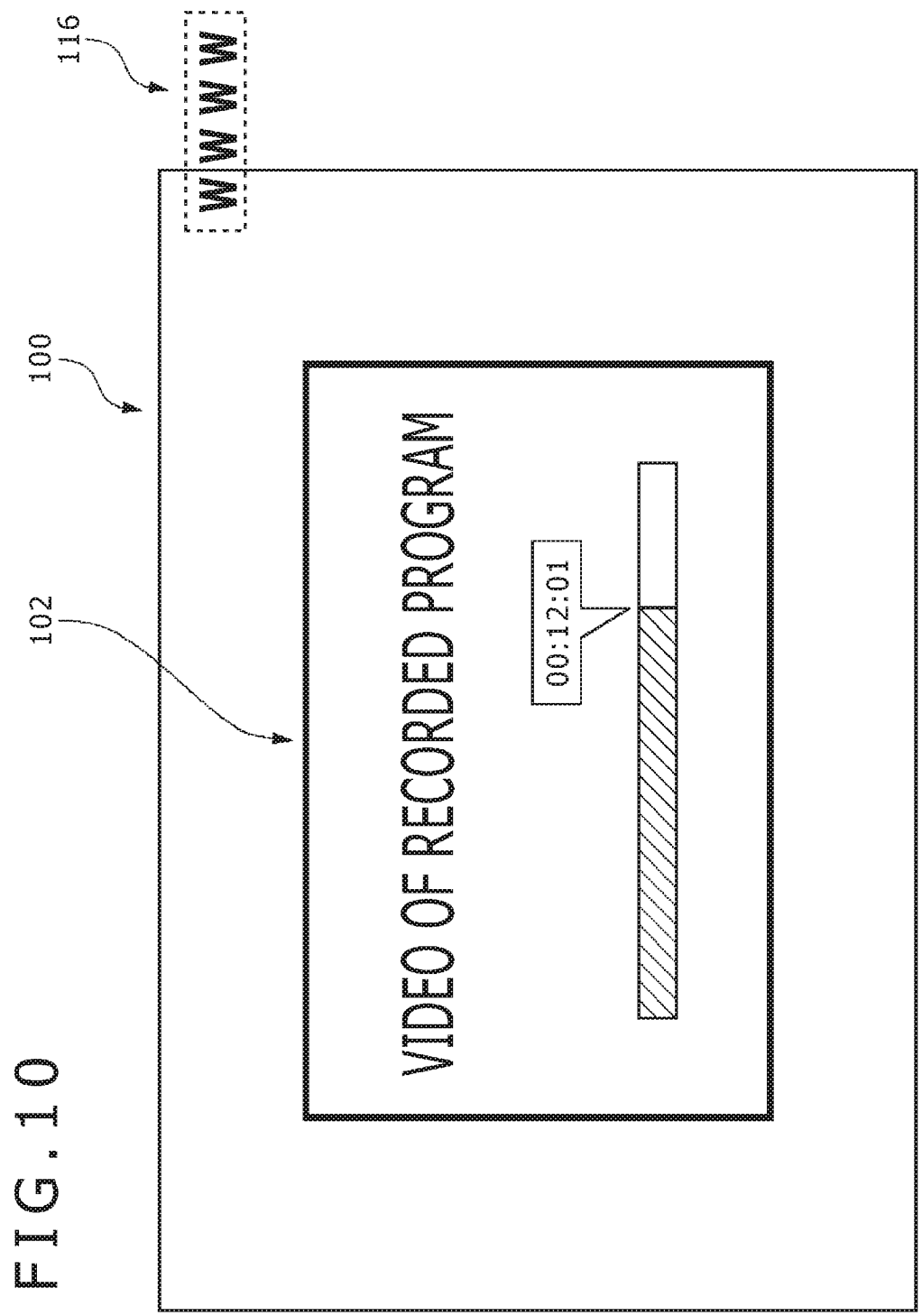
FIG. 10 is a schematic diagram illustrating how a comment is displayed during reproduction of a recorded program.

FIG. 10 schematically illustrates how a comment is displayed during reproduction of a recorded program. FIG. 10 shows that when the video broadcast at "00:12:01" is displayed in the video display region 102, a comment 116 posted at that broadcast time starts to be scrolled. Alternatively, instead of comparing the video broadcast times with the comment posting times for a match, it is possible to calculate an offset time from the time at which the program was started until the time at which a given comment was posted, on the basis of the posting time of that comment. This permits displaying of the comment coinciding with the offset time between the start of the reproduction (i.e., of the program) and the currently displayed video.

Returning to FIG. 5, the comment count displaying section 78 includes a first comment count displaying section 80 configured to display the actually counted number of comments with the game machine 12, and a second comment count displaying section 82 configured to display the number of the comments provided by the comment management server 20.

The first comment count displaying section 80 displays the comment count indicator 108, shown in FIG. 1, in the comment display region 104. The first comment count displaying section 80 allows the comment count indicator 108 to display the actually counted number of the comments acquired in a predetermined unit time. Specifically, the first comment count displaying section 80 counts the number of the comments acquired during the latest five seconds regarded as the counting unit time, totals the number of the comments acquired in the latest one minute regarded as the totaling unit time, and displays the totaled result. In other words, the first comment count displaying section 80 counts the number of the comments acquired in the latest five seconds and adds that count to the number of the comments acquired in the preceding 55 seconds. The first comment count displaying section 80 then allows the comment count indicator 108 to display the sum total as the number of the comments posted in the latest one minute.

During less than one minute after the start of the display of video content, the actual number of comments in the one-minute period cannot be counted. In this case, the first comment count displaying section 80 estimates the number of the comments to be posted in one minute on the basis of the previous actual counts. For example, if the number of the comments posted in the first five seconds is 10, the first comment count displaying section 80 estimates the comment count per minute at 120, i.e., 12 times the count of 10, and allows the comment count indicator 108 to display the estimated value. Likewise, if the number of the comments posted in the first 20 seconds is 30, the first comment count displaying section 80 estimates the comment count per minute at 90, i.e., three times the count of 30. In this manner, the first comment count displaying section 80 can present the user with a substantially accurate surge in the number of the comments being posted in a short time since the start of the display of video content.

The first comment count displaying section 80 varies the color of the indicator frame 110 in keeping with the number of the comments posted in the latest one minute. Specifically, the first comment count displaying section 80 displays the indicator frame 110 in blue if the counted number of the comments posted in the latest one minute is smaller than 100, in green if the count is between 100 and 199, in yellow if the count is between 200 and 999, and in red if the count is equal to or higher than 1,000. Five seconds after updating the comment count indicator 108, the first comment count displaying section 80 again counts the number of comments in the latest five seconds. On the basis of the result of the count, the first comment count displaying section 80 again updates the comment count in the comment count indicator 108 and the color of the indicator frame 110.

Figure 11:
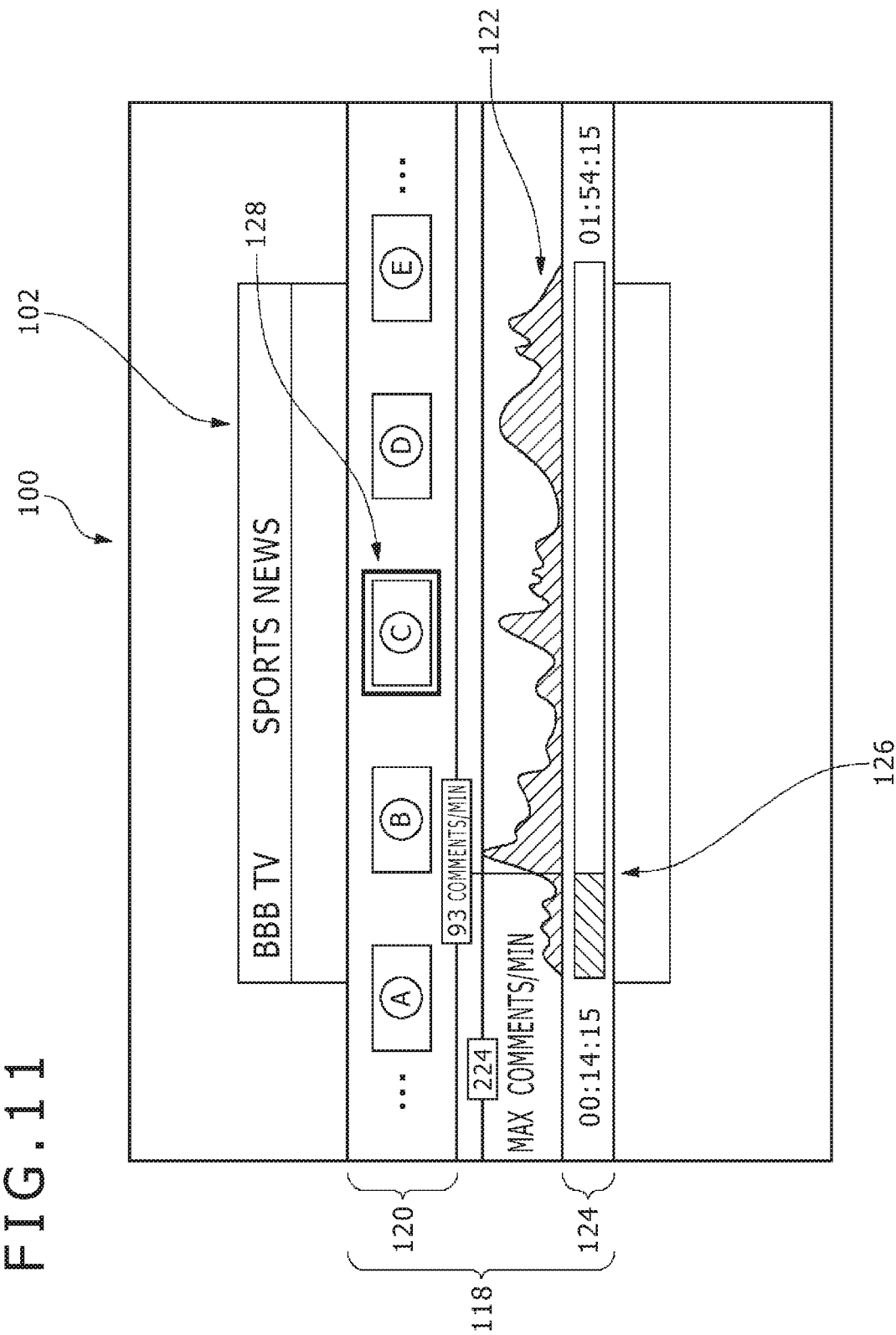
FIG. 11 is a schematic diagram showing a scene search screen.

The scene search screen displaying section 84 displays a scene search screen if a predetermined operation is received during reproduction of recorded video content. FIG. 11 shows a typical scene search screen. The scene search screen 118 includes a plurality of program images 120 as still images indicative of various scenes of the recorded video content, a comment count transition graph 122, and a reproduction time bar 124.

From the comment management server 20, the comment acquiring section 56 acquires statistical values of the numbers of the pieces of content posted to the comment management server 20 when recorded video content was actually broadcast. Specifically, the comment acquiring section 56 acquires the number of the comments posted per minute from the comment management server 20. The second comment count displaying section 82 creates the comment count transition graph 122 showing statistical values at intervals of one minute arrayed chronologically with regard to the video content, the statistical values being acquired from the comment management server 20. The comment count transition graph 122 is displayed on the scene search screen 118.

In the reproduction time bar 124 on the scene search screen 118, a specific time point 126 in the entire recording time is designated. When the designation is made, the second comment count displaying section 82 displays the number of the comments corresponding to the designated time point. In other words, the second comment count displaying section 82 displays the number of the comments actually posted to the comment management server 20 at the designated time point ("93" in the example of FIG. 11). Using a cursor 128, the scene search screen displaying section 84 places in a focused state the program image 120 indicating the scene of the program corresponding to the time point designated in the reproduction time bar 124, i.e., the scene of the program broadcast at that time point.

In that state, the user inputs an operation to designate the start of the video display. The operation causes the reproduction processing section 54 to start reproducing the video recording data from the time point designated in the reproduction time bar 124. The video displaying section 70 starts to display the video from the time point designated in the reproduction time bar 124, i.e., from the video broadcast at the time corresponding to the designated time point. The ordinary comment displaying section 74 and the low-value comment displaying section 76 start scrolling the comments whose time information corresponds to the time point designated in the reproduction time bar 124.

The channel setting screen displaying section 86 causes the display device 14 to display a channel setting screen serving as a user interface for setting the corresponding relations between the video offering station and the comment destination station on each of a plurality of channels that can be selected by the user. FIG. 12 shows a typical channel setting screen. The channel setting screen 136 includes a video offering station selecting column 138 for selecting the video offering station of each channel, and a comment destination station selecting column 140 for selecting the comment destination station of each channel.

If the video offering station input to the video offering station selecting column 138 is the same as the broadcaster regarding which comments are to be posted to the comment management server 20, the channel setting screen displaying section 86 automatically sets the video offering station as the comment destination station to the comment destination station selecting column 140. The comment destination station thus set automatically in the comment destination station selecting column 140 may be changed manually by the user.

If the video offering station input to the video offering station selecting column 138 is different from the broadcaster regarding which comments are to be posted to the comment management server 20, the channel setting screen displaying section 86 identifies another broadcaster belonging to the same broadcasting network as that of the video offering station, by referencing the corresponding relations held in the broadcaster information holding section 46. For example, the channel setting screen displaying section 86 identifies, as another broadcaster, the key station belonging to the same broadcasting network. The channel setting screen displaying section 86 proceeds to set automatically the other broadcaster thus identified as the comment destination station in the comment destination station selecting column 140.

What follows is a description of the operations of the program viewing system 10 structured as explained above. The viewer viewing a currently broadcast program may post to the comment management server 20 the comments of his or her impressions about the program from time to time through the viewer terminal 22. The comment management server 20 holds the comment data posted from the viewer terminal 22. The comment management server 20 also transmits the posted comment data consecutively to the viewer terminal 22 and the game machine 12, both being currently accessing web clients. The taboo word acquiring section 58 of the game machine 12 acquires at a suitable timing the taboo words previously registered in the game machine 12.

Below is a description of the operations involved in viewing currently broadcast content. The user of the game machine 12 starts the television viewing and recording application installed in the game machine 12 and selects the viewing of the program currently broadcast on a particular channel. The video information acquiring section 52 acquires from the tuner 16 the data of the currently broadcast video on the selected channel. The video displaying section 70 displays the video of the program in the video display region 102 on the viewing screen 100. The comment acquiring section 56 successively acquires from the comment management server 20 other viewers' comments posted with regard to the program currently displayed in the video display region 102. The scroll speed determining section 60 determines the scroll speed for each acquired comment. The larger the display size of the comment, the higher the scroll speed set for that comment.

The ordinary comment displaying section 74 scrolls each of the comments acquired by the comment acquiring section 56 in one of the lanes in the comment display region 104 on the viewing screen 100 at the scroll speed determined by the scroll speed determining section 60. At this time, as to a plurality of comments scrolled in the same lane, the start of the scrolling of the ensuing comment is suitably delayed so that the ensuing comment will not overlap with the preceding comment. This promotes the visibility of a plurality of comments being scrolled. If any comment includes any taboo word, the display of that comment is skipped.

The ordinary comment displaying section 74 hides from view the characters in the character string of each comment successively when they start overlapping with the video display region 102 during the comment scrolling process. If at least part of the comment is hidden, the ordinary comment displaying section 74 still continues to update the original drawing position of the comment character string. As the characters making up the comment and overlapping with the video display region 102 emerge from their hidden state, the hidden characters are again displayed successively. This makes it possible in a relatively easy manner to present the user with both the program video and other viewers' comments about the video without detracting from the integrity of the program video.

Also, the ordinary comment displaying section 74 selects preferentially the lanes which do not overlap with the video display region 102 and in which the comments are to be scrolled. When the number of acquired comments increases, the ordinary comment displaying section 74 switches to additionally selecting the lanes overlapping with the video display region 102. This facilitates keeping the comments displayed as much as possible during the scrolling process and thereby maintaining their visibility. When a large number of comments are posted at the same time, they can be displayed parallelly and simultaneously on the screen. The delays from the posting of each comment until its display on the screen are thus reduced.

It might happen that the number of the posted comments rises in a short time and thus the comment acquiring section 56 acquires an increased number of comments. This can prolong the waiting times until the start of the display of comments even in parallel in 12 lanes. Accordingly, if the waiting time for the comments to start getting displayed in all 12 lanes becomes longer than a predetermined time period, the value determining section 62 starts to determine whether each acquired comment is a low-value comment.

By mainlining a minimal, intentionally reduced visibility of low-value comments during their display, this embodiment utilizes the low-value comments as an ornament indicative of the surge in the number of comment postings. Specifically, the low-value comment displaying section 76 scrolls low-value comments in the comment display region 104 in a manner keeping their visibility lower than ordinary comments. Unlike with ordinary comments, the low-value comment displaying section 76 displays the low-value comments preferentially in the regions that partially overlap with the video display region 102. Also, the low-value comments are each allowed to overlap with another comment.

Because the comments deemed to be less valuable for viewing by the user are displayed in a relatively inconspicuous manner, it is possible to reduce the drop in the visibility of ordinary comments that are more valuable even if the number of comments has increased in a short time. In the case of a surge in the number of comments over a short time period, the rise in the number of the comments waiting to be displayed can be reduced. The low-value comments are displayed preferentially in the regions hidden by the video display region 102, and the low-value comments are each allowed to overlap with another comment. This makes it possible to let the user recognize the situation where the number of comment postings is surging while minimizing the drop in the visibility of ordinary comments.

The first comment count displaying section 80 displays the comment count indicator 108 in the comment display region 104 on the viewing screen 100. At intervals of five seconds, the first comment count displaying section 80 counts the number of the comments acquired in the latest 60 seconds. The first comment count displaying section 80 proceeds to display both the number of the comments acquired in the latest 60 seconds and the indicator frame 110 in the color corresponding to the comment count. In this manner, the most recently counted number of the comments posted with regard to the video content currently displayed in the video display region 102 is displayed in real time, and the displayed comment count is updated over time. This allows the user to easily recognize the surge in the number of comment postings.

Explained next are the operations specific to viewing recorded video content. The same operations as those involved in viewing the currently broadcast video content may be omitted hereunder where redundant.

The user of the game machine 12 starts the television viewing and recording application installed therein, and selects the video recording data to be reproduced from among the video recording data held in the storage device 18 or in the video recording data holding section 40. From among the video recording data, the reproduction processing section 54 reproduces the video data of the target program that was broadcast in the past. The video displaying section 70 displays the reproduced program video in the video display region 102 on the viewing screen 10. The comment acquiring section 56 acquires from the comment management server 20 other viewers' comments posted in the past with regard to the currently displayed program in the video display region 102.

Upon display of a program video previously broadcast at a given time point, the ordinary comment displaying section 74 and the low-value comment displaying section 76 scroll the comments associated with the posting time coinciding with that time point, the scrolled comments being among those acquired by the comment acquiring section 56. This maintains the corresponding relations between other viewers' comments and each specific scene of the program regarding which the comments were posted. In other words, it is possible to minimize the gap between the comments and the program scenes that were displayed when these comments were posted.

During the comment scrolling process, the ordinary comment displaying section 74 and the low-value comment displaying section 76 hide the characters constituting the comment character string and overlapping with the video display region 102 while letting the characters be displayed when they do not overlap with the video display region 102. This maintains the integrity of the program video of the recorded program being viewed. The operations for selecting the lanes, determining low-value comments, and displaying the comment count indicator 108, among others, are substantially the same as the corresponding operations involved in displaying the currently broadcast video content.

When the user inputs an operation to designate a change in the speed of reproduction, the reproduction processing section 54 changes accordingly the generation speed for reproduced image frames. In response to the user's operation, the video displaying section 70 changes the display switching speed for the reproduced image frames. At this point, the scroll speed determining section 60 changes the scroll speed for comments in accordance with the user's operation.

For example, if 1.5×-speed fast-forward reproduction is designated, the scroll speed for comments is increased to a speed 1.5 times the value determined in keeping with the display size of the comments. If 0.5×-speed slow-forward reproduction is designated, the scroll speed for comments is lowered to a speed 0.5 times the value determined in accordance with the display size of the comments. The ordinary comment displaying section 74 and the low-value comment displaying section 76 scroll the comments at the speed determined on the basis of the display size of the comments and the reproduction speed in effect. This maintains the corresponding relations between other viewers' comments and the particular program scenes regarding which the comments were posted.

While viewing a recorded program, the user may input an operation to designate the display of the scene search screen. The operation causes the scene search screen displaying section 84 to display the scene search screen 118 on the viewing screen 100. The second comment count displaying section 82 displays the comment count transition graph 122 in chronological order along the reproduction time bar 124 on the scene search screen 118. When the user selects a specific time point in the reproduction time bar 124, the scene search screen 118 places into a focused state the program image 120 broadcast at that time point. At the same time, the second comment count displaying section 82 displays the number of the comments posted at that time point. With the specific time point selected in the reproduction time bar 124, the user's input of an operation to designate the start of reproduction causes the scene search screen displaying section 84 to stop displaying the scene search screen 118. At the same time, the video displaying section 70 restarts displaying the program video from the program image 120 in the focused state.

Because the scene search screen 118 is displayed together with the transition in the number of comment postings, the user is assisted in selecting a desired program scene on the scene search screen 118. The number of comment postings may have strong positive correlation with the viewership of a given program or the loudness of voices in the program in some cases. In other cases, the number of comment postings may not have direct correlation with the viewership of the given program or the loudness of voices in the program; the comment posting count may surge when a video that "looks exactly right" to viewers is displayed. The scene search screen 118 of this embodiment can present the user with the particular scenes in the program which attract viewers' interest and which cannot be gauged in terms of the viewership of the program or the loudness of voices in that program. This helps raise the user's interest in viewing recorded programs.

Explained next are the operations involved with the corresponding relations between the broadcasters offering video content (i.e., video offering stations) and the broadcasters for which comments are destined (i.e., comment destination stations).

Typically, as part of the initialization of the television viewing and recording application installed in the game machine 12, the user sets the channels in a manner associating the video offering station with the comment destination station. At this point, the user inputs an operation to designate the display of the channel setting screen. The channel setting screen displaying section 86 causes the display device 14 to display the channel setting screen 136. The user inputs the video offering station to the video offering station selecting column 138 on the channel setting screen 136.

If the user lives in a locality where a local broadcasting station broadcasts TV programs, the user inputs that local broadcasting station to the video offering station selecting column 138. If the video offering station input to the video offering station selecting column 138 is one of a plurality of predetermined broadcasters for which comments are destined (called the "comment destination station candidates"

hereunder), the channel setting screen displaying section 86 automatically sets that video offering station to the comment destination station selecting column 140 as the comment destination station. The comment destination station candidates of this embodiment are determined in advance at the posting site of the comment management server 20. For example, the comment destination station candidates may be the key and subkey stations headquartered in Tokyo or Osaka.

If the video offering station input to the video offering station selecting column 138 is none of the comment destination station candidates, the channel setting screen displaying section 86 identifies a suitable comment destination station candidate from among the comment destination station candidates, the suitable candidate belonging to the same broadcasting network as that of the video offering station. For instance, if the video offering station is a local broadcasting station not included in the comment destination station candidates, the key station of the broadcasting network to which the local broadcasting station belongs may be identified. The channel setting screen displaying section 86 automatically sets a suitable comment destination station candidate belonging to the same broadcasting network as that of the video offering station to the comment destination station selecting column 140 as the comment destination station. The channel setting recording section 66 stores into the video-comment corresponding relation holding section 48 the corresponding relations between the video offering station and the comment destination station following their final approval by the user on the channel setting screen 136.

The video information acquiring section 52 acquires from the tuner 16 the video data of the program broadcast by the video offering station associated with a particular channel selected by the user. In the video display region 102 on the viewing screen 100, the video displaying section 70 displays the video of the program acquired by the video information acquiring section 52. The comment acquiring section 56 acquires from the comment management server 20 the comment data regarding the program and posted to the comment destination station associated with the video offering station. The comment displaying section 72 displays the comment data acquired by the comment acquiring section 56 in the comment display region 104 on the viewing screen 100.

The embodiment described above addresses users who view the program of a broadcaster such as a local broadcasting station that is not the broadcaster regarding which comments are posted to the comment management server 20 concerning the program. The embodiment can thus present such users with the comments posted to a different broadcaster belonging to the same broadcasting network as that of the local broadcasting station with regard to the program. It might happen that the broadcasters belonging to the same broadcasting network broadcast the same program in the same time slot. For example, a program produced and broadcast by the key station may be broadcast simultaneously by the affiliated local broadcasting stations. The user viewing the program of a broadcaster different from the one regarding which comments are posted to the comment management server 20 is thus offered meaningful comments on a best-effort basis. This in turn heightens the user's interest in viewing the broadcast program.

If the broadcaster designated as the video offering station on the channel setting screen 136 is not the one regarding which comments are posted to the comment management server 20, a broadcasting station affiliated with the designated broadcaster is automatically set as the comment destination station. This helps provide the user with the comments posted to the affiliated station while minimizing the user's trouble.

The present invention has been described in conjunction with a specific embodiment given as an example. It should be understood by those skilled in the art that the embodiment is for illustrative purposes only, that the above-described components and various processes may be combined in diverse ways, and that such variations also fall within the scope of this invention. Some of these variations will be described hereunder.

A first variation is explained below. The comment acquiring section 56 may acquire, as additional data about the comments to be acquired from the comment management server 20, parameters defining the manner of comment display as designated by the posting viewers regarding their comments. For example, the parameters may represent the character size and the color of the characters making up each comment. The comment displaying section 72 may thus display comments with the character size and color defined by the parameters added to the comments, e.g., with a character size and a color different from those in default mode where such parameters are not designated. The processing of the first variation may be performed solely by the ordinary comment display section 74. The low-value comment displaying section 76 may disregard all such parameters and display all low-value comments in the same, inconspicuous manner.

A second variation is explained. The video information acquiring section 52 may acquire the data of video and moving image content from external devices such as web servers via the Internet. The video and moving image content may also be provided by video-on-demand services and video sharing sites. The communication section 30 may conduct P2P communication with the viewer terminal 22. By means of such P2P communication sessions, the comment acquiring section 56 may directly receive comment data transmitted from the viewer terminal 22.

A third variation is explained. It is assumed for the above-described embodiment that the comments displayed on the viewing screen 100 are the comments posted by other viewers to the posting site. However, the comments are not limited to those originating from the other viewers. For example, the comment displaying techniques of the above embodiment also apply to cases in which predetermined comments stored beforehand in the game machine 12 are displayed together with video content. The comments applicable to the third variation may be diverse information about video content (such as descriptions of the characters in a drama, introductions to other video content, and subtitles).

A fourth variation is explained. It is assumed for the embodiment above that with a particular time point designated in the reproduction time bar 124 on the scene search screen 118, the user's input of an operation to designate the start of display causes the reproduction processing section 54 to start reproducing the video recording data from the time point designated in the reproduction time bar 124. In the fourth variation, the reproduction processing section 54 may start reproducing the video recording data from a predetermined time point preceding (e.g., by five to ten seconds) the time point designated in the reproduction time bar 124. Likewise, the video displaying section 70 may start the display from the reproduced image preceding, by a predetermined time period, the time point designated in the reproduction time bar 124. Comments are usually posted after the viewers have viewed the program video. Hence the reproduction of the program video started earlier than the time point designated by the user in reference to the comment count transition graph 122. This facilitates presenting the user with specific scenes that have influenced the comment postings from the viewers (e.g., in terms of the surge in the posting count).

Also, suitable combinations of the above-described embodiment and its variations are each effective as another embodiment of the present invention. The new embodiments thus implemented provide the effects of both the original embodiment and the variations combined therewith. It will further be understood by those skilled in the art that the functions to be exerted by the component elements stated in the ensuring claims are implemented either by each of the components discussed above in connection with the embodiment and its variations or by a coordinated combination of these individual components.

REFERENCE SIGNS LIST

10 Program viewing system
12 Game machine
20 Comment management server
56 Comment acquiring section
60 Scroll speed determining section
62 Value determining section
70 Video displaying section
72 Comment displaying section
78 Comment count displaying section
86 Channel setting screen displaying section
102 Video display region

INDUSTRIAL APPLICABILITY

The present invention can be applied to devices configured to display video content.

The invention claimed is:

1. An information processing device comprising:
a video displaying section configured to display video content in a video display region on a screen, where the video content includes a background extending to a periphery of the video display region;
a comment acquiring section configured to acquire a plurality of comments related to the video content; and
a comment displaying section configured to scroll the plurality of comments acquired by the comment acquiring section on the screen currently displaying the video content,
wherein the comment displaying section displays the plurality of comments in a comment display region, where the video display region at least partially occludes the comment display region such that: (i) at least a portion of one of the plurality of comments is occluded by the video display region and by the background of the video, (ii) none of the plurality of comments occlude any portion of the video display region, and (iii) a given comment among the plurality of comments is displayed when a position of the given comment does not overlap with the video display region and hides the given comment from view when a position of the given comment overlaps with the video display region,
wherein the comment displaying section scrolls a comment in one of a plurality of lanes making up the screen,
wherein the lanes include a first lane not overlapping with the video display region and a second lane partially overlapping with the video display region,
wherein the comment displaying section preferentially selects the first lane as a lane in which to scroll comments, and additionally selects the second lane if an amount of comments acquired by the comment acquiring section is equal to or higher than a predetermined amount,
wherein the plurality of lanes have a major dimension and a minor dimension, where each of the first and second lanes carries respective, different comments, and where a scrolling direction through each of the comments coincides with a direction of the major dimension of each of the respective first and second lanes, and
wherein the major dimension of the plurality of lanes is greater than a corresponding dimension of the video display region such that at least a first portion of each of the plurality of lanes is not occluded by the video display region, while at least a second portion of at least some of the plurality of lanes is occluded by the video display region.

2. The information processing device according to claim 1, further comprising
a determining section configured to determine whether a comment acquired by the comment acquiring section is a second comment to be set lower in display priority than a first comment,
wherein the comment displaying section scrolls the second comment with a lower visibility than the first comment.

3. The information processing device according to claim 2, wherein the comment displaying section scrolls a plurality of first comments in a manner not overlapping with one another, and scrolls the second comment in a manner allowed to overlap with the first comment.

4. The information processing device according to claim 2, wherein the comment displaying section preferentially selects a region not overlapping with the video display region as a region in which to scroll the first comment, and preferentially selects a region partially overlapping with the video display region as a region in which to scroll the second comment.

5. The information processing device according to claim 2, wherein, if an amount of comments acquired by the comment acquiring section is equal to or higher than a predetermined amount, the determining section determines whether an acquired comment is the second comment.

6. The information processing device according to claim 2, wherein the determining section determines a comment to be the second comment if the comment has the same character or the same symbol repeated consecutively therein at least a predetermined number of times.

7. The information processing device according to claim 2, wherein, if a plurality of comments identical in content are acquired, the determining section determines at least one of the identical content comments to be the second comment.

8. The information processing device according to claim 1, wherein the comment displaying section sets a speed for scrolling a comment higher as a display size of the comment gets larger and delays, if a comment is scrolled at a speed higher than a speed of a preceding comment, starting to scroll the ensuing comment so that the ensuing comment will not overlap the preceding comment in the course of the scrolling.

9. The information processing device according to claim 1, further comprising a comment count displaying section configured to display the number of comments acquired in a predetermined unit time, the comment count displaying section further updating the comment count over time.

10. A display method for a computer, comprising:
displaying video content in a video display region on a screen, where the video content includes a background extending to a periphery of the video display region;
acquiring plurality of comments related to the video content; and
scrolling the plurality of comments acquired in the acquiring on the screen currently displaying the video content,
wherein the scrolling displays the plurality of comments in a comment display region, where the video display region at least partially occludes the comment display region such that: (i) at least a portion of one of the plurality of comments is occluded by the video display region and by the background of the video, (ii) none of the plurality of comments occlude any portion of the video display region, and (iii) a given comment among the plurality of comments is displayed when a position of the given comment does not overlap with the video display region and hides the given comment from view when a position of the given comment overlaps with the video display region,
wherein the displaying includes scrolling a comment in one of a plurality of lanes making up the screen,
wherein the lanes include a first lane not overlapping with the video display region and a second lane partially overlapping with the video display region,
wherein the displaying includes preferentially selecting the first lane as a lane in which to scroll comments, and additionally selecting the second lane if an amount of comments acquired by the acquiring is equal to or higher than a predetermined amount,
wherein the plurality of lanes have a major dimension and a minor dimension, where each of the first and second lanes carries respective, different comments, and where a scrolling direction through each of the comments coincides with a direction of the major dimension of each of the respective first and second lanes, and
wherein the major dimension of the plurality of lanes is greater than a corresponding dimension of the video display region such that at least a first portion of each of the plurality of lanes is not occluded by the video display region, while at least a second portion of at least some of the plurality of lanes is occluded by the video display region.

11. A non-transitory, computer readable storage medium containing a computer program, which when executed by a computer, causes the computer to carry out actions, comprising:
displaying video content in a video display region on a screen, where the video content includes a background extending to a periphery of the video display region;
acquiring plurality of comments related to the video content; and
scrolling the plurality of comments acquired in the acquiring on the screen currently displaying the video content,
wherein the scrolling displays the plurality of comments in a comment display region, where the video display region at least partially occludes the comment display region such that: (i) at least a portion of one of the plurality of comments is occluded by the video display region and by the background of the video, (ii) none of the plurality of comments occlude any portion of the video display region, and (iii) a given comment among the plurality of comments is displayed when a position of the given comment does not overlap with the video display region and hides the given comment from view when a position of the given comment overlaps with the video display region,
wherein the displaying includes scrolling a comment in one of a plurality of lanes making up the screen,
wherein the lanes include a first lane not overlapping with the video display region and a second lane partially overlapping with the video display region,
wherein the displaying includes preferentially selecting the first lane as a lane in which to scroll comments, and additionally selecting the second lane if an amount of comments acquired by the acquiring is equal to or higher than a predetermined amount,
wherein the plurality of lanes have a major dimension and a minor dimension, where each of the first and second lanes carries respective, different comments, and where a scrolling direction through each of the comments coincides with a direction of the major dimension of each of the respective first and second lanes, and
wherein the major dimension of the plurality of lanes is greater than a corresponding dimension of the video display region such that at least a first portion of each of the plurality of lanes is not occluded by the video display region, while at least a second portion of at least some of the plurality of lanes is occluded by the video display region.

12. The information processing device according to claim 1, further comprising
a comment count displaying section configured to display a transition in chronological order in the number of comments posted with regard to the program,
wherein, when the user designates a particular time point in the chronological order, the video displaying section displays the video starting from a video broadcast at the time corresponding to the designated time point.

13. The information processing device of claim 1, wherein:
the video displaying section is configured to display a video of a program broadcast by a first broadcaster;
the comment acquiring section is configured to acquire a comment of a viewer with regard to a program broadcast by a second broadcaster; and
the comment displaying section is configured to display, on a screen currently displaying the video of the program broadcast by the first broadcaster, the comment of the viewer acquired by the comment acquiring section with regard to the program broadcast by the second broadcaster,
wherein the second broadcaster is different from the first broadcaster and belongs to a broadcasting network same as a broadcasting network of the first broadcaster.

14. The information processing device according to claim 13, further comprising
a setting screen displaying section configured to display a setting screen for allowing a user to designate corresponding relations between the first broadcaster and the second broadcaster,
wherein, when the broadcaster designated as the first broadcaster on the setting screen is not among broadcasters that can acquire the comment of the viewer, the setting screen displaying section causes the setting screen to display, as the second broadcaster, one of the broadcasters that can acquire the comment of the viewer and belongs to a broadcasting network same as a broadcasting network of the designated broadcaster.

* * * * *